Dec. 11, 1951        P. J. ERNISSE        2,578,295

FILM TAKE-UP CHAMBER FOR PHOTOGRAPHIC APPARATUS

Filed Oct. 19, 1948

PAUL J. ERNISSE
INVENTOR

BY

ATTORNEYS

Patented Dec. 11, 1951

2,578,295

UNITED STATES PATENT OFFICE 2,578,295

FILM TAKE-UP CHAMBER FOR PHOTOGRAPHIC APPARATUS

Paul J. Ernisse, Rochester, N. Y., assignor to Eastman Kodak Company, Rochester, N. Y., a corporation of New Jersey Application October 19, 1948, Serial No. 55,275

12 Claims. (Cl. 242—71)

This invention relates to photography and particularly to take-up chambers for photographic film. One object of my invention is to provide a take-up chamber of variable length so constructed that the length may change as the size of a coil of film in the chamber increases. Another object of my invention is to provide a take-up chamber with a means for forming a firm, even coil of film which does not contact with the longitudinal walls of the chamber and which is supported by the edges only of the film. A still further object of my invention is to provide a take-up chamber into which the end of a film may be propelled, at least one of the walls of the chamber being so shaped that convolutions of film of the desired diameter may be formed in the chamber. A still further object of my invention is to provide a take-up chamber in which binding of the film against any of the chamber walls is eliminated. Other objects will appear from the following specification, the novel features being particularly pointed out at the end thereof.

In photographic apparatus, such as cameras and projectors, roll film may be coiled about a spool which is inserted in a supply chamber from which the film is propelled across an exposure aperture through suitable guideways to a take-up chamber where the film may be loosely coiled for temporary storage before being returned to the original spool for removal from the apparatus. Such apparatus has the advantage of being quickly loaded and rapidly operated, but it is frequently difficult to cause the loose coil of film to move smoothly and without considerable friction. If a cylindrical container of greater length than the width of the film is employed, after a few convolutions the film will bind against the outside of the container, making further movement difficult, if not impossible, and likewise scratching film. In order to overcome this, leaf springs coiled in a generally inwardly direction have been employed, so that as additional convolutions pass into the chamber this spring may expand. This is more desirable than no film guide at all, but it has the difficulty of causing scratching on the film surface in many instances, since one surface may be pushed inwardly against a spring so that the picture area may become scratched. My present invention is particularly directed to a structure which will overcome these difficulties.

Coming now to the drawings wherein like reference characters denote like parts throughout:

My invention comprises broadly a take-up chamber of variable length into which a film may be thrust, the amount of film in the film chamber varying the length of the chamber. This chamber is so arranged that inclined walls engage the upper edge of the outer convolution of film, while the lower edges of the film contact with a fixed wall. In this way, that portion of the film on which the latent images may lie does not come in contact with anything except the next adjacent film coil, nor is the back of the film contacted with the surrounding walls of the enclosure.

Figure 1:
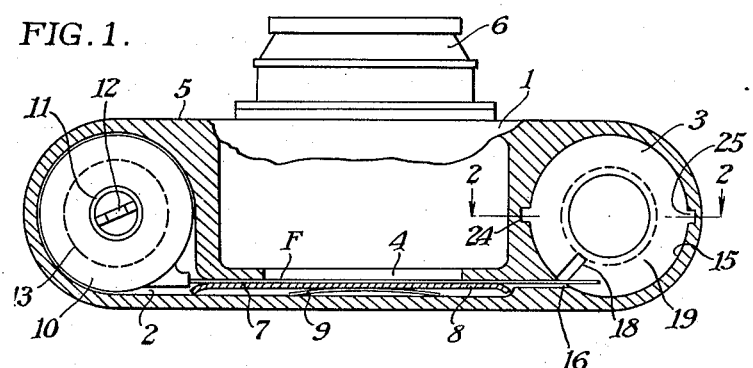
Fig. 1 is a sectional view through a camera including a take-up chamber constructed in accordance with and embodying a preferred form of my invention.
Figure 2:
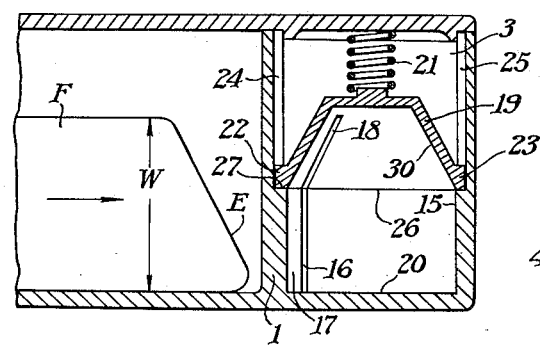
Fig. 2 is an enlarged detail section taken on line 2—2 of Fig. 1 with the end of a film approaching the take-up chamber.
Figure 3:
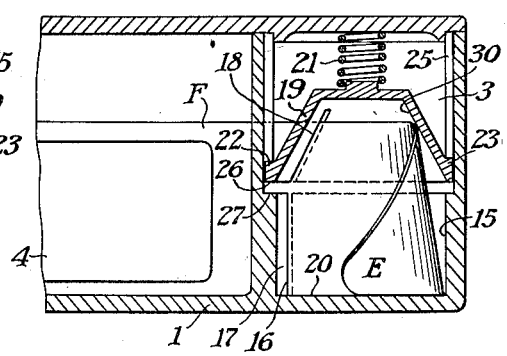
Fig. 3 is a view similar to Fig. 2 but shown with the film after entering the film chamber.
Figure 5:
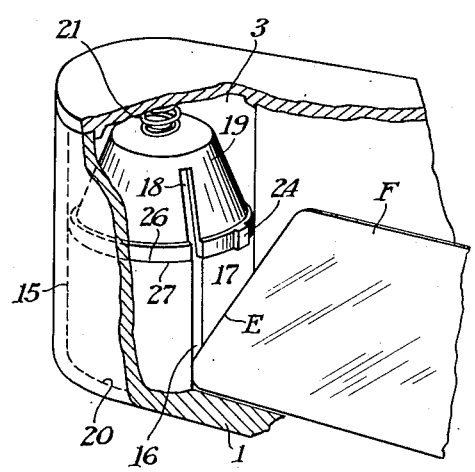
Fig. 5 is a fragmentary perspective view partially in section showing the take-up chamber from the rear.

While my invention is equally adapted for different types of photographic apparatus, such as cameras, projectors, film viewers, and the like, I have illustrated, by way of a preferred embodiment of my invention, a camera equipped with my preferred type of take-up chamber. As shown in Fig. 1, this camera may consist of a body portion 1 having a supply spool chamber 2 and a take-up chamber 3 arranged on opposite sides of an exposure frame 4. The front wall 5 of the camera may support an objective in the usual mount 6 to form an image of an object being photographed at the focal plane 4. There is a film passageway 7 leading from the supply chamber 2 to the take-up chamber 3 which is preferably equipped with a known type of presser plate 8 pressed forwardly by springs 9 to hold the film flat over the exposure frame. A film "F" may be supplied on a spool or in a retort 10, as shown; the end of the film being attached to a hub member 11 which may be turned by a winding key 12 through a knob or handle 13 on the outside of the camera, as is well known. The end of the film "E" may be tapered, as shown in Fig. 2, so that it may be propelled through the film passageway 7 and into the take-up chamber 3 by turning the knob 13.

My improved film take-up chamber is here shown as having a generally cylindrical wall 15 with an aperture 16 leading to the chamber from the film passageway 7. This aperture 16 is best shown in Fig. 2 and it extends the full length of the exposed portion 17 of the chamber, and, also, it extends upwardly at 18 through the cap-like member 19 which forms a movable wall of the chamber which may move axially of the fixed bottom wall 20.

Figure 4:
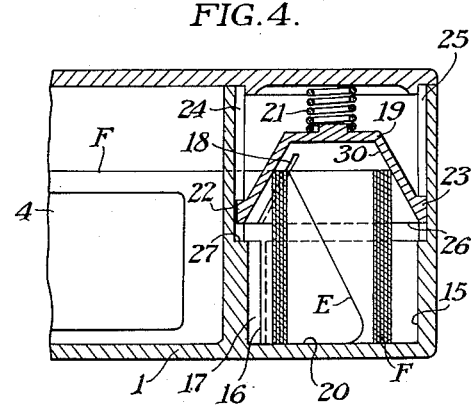
Fig. 4 is a view similar to Fig. 3 but with a number of film convolutions shown wound into the take-up chamber.

A light spring 21 normally holds the movable wall 19 downwardly and there are flanges 22 and 23 which engage in slots 24 and 25 which permit the movable wall to move axially, but not to turn. When in its lowermost position an edge 26 of the movable wall may engage the flange 27 to limit the downward movement of the cap member. The combined height of the slots 18 and 16 is greater than the width "W" of a film, so that when the end of the film "E" engages the slot 16 and passes into the film chamber, there is always a sufficiently wide slot to permit its passageway even when the length of the chamber is at its minimum, as shown in Fig. 2. When the film "E" is propelled into the temporary take-up chamber 3, the upper edge of the film "F" may engage an inclined wall 30 of the movable wall 19. While I have found that these walls may be inclined, as shown in the drawing in Fig. 2, it is also obvious that they make take other shapes as, for instance, a section of a sphere, because the purpose of the inclined walls 30 is to cause the end "E" of the film to contact with the walls only along the extreme edge of the outer convolution of film, as shown in Fig. 4, while the lower edge of the film convolutions rest on the relatively fixed wall 20 in the bottom of the chamber.

As the film "F" is propelled into the take-up chamber 3, each successive convolution merely raises the cap-like movable wall 19 so that it may move upwardly against the pressure of spring 21. Thus, the length of the film chamber is directly controlled by the number of convolutions and the convolutions of film will always be held away from all other walls of the chamber except the movable top wall and the fixed bottom wall. The emulsion-coated side of the film and the film backing therefor remains out of contact with the walls of the enclosure during the winding and rewinding operation.

It is customary in apparatus of this type to place a supply of film in the supply chamber to turn the film so that the end of the film will move down the film passageway where it is temporarily stored in the take-up chamber. Thus, film is propelled into and removed from my improved form of take-up chamber without any tendency on the part of the film to bind, since each additional convolution which increases the outside diameter of the convolutions merely causes the movable wall 19 to move upwardly against the pressure of spring 21. Since the movable wall 19 cannot turn, the slots 16 and 18 are always held in position to permit the passage of film.

While I have shown an improved form of film take-up chamber which greatly facilitates the proper winding and rewinding of film, it is obvious that variations in form will at once suggest themselves to those skilled in the art. I consider as within the scope of my invention all such forms as may come within the scope of the appended claims.

I claim:

1. A film take-up chamber for use in photographic apparatus, the apparatus including a supply chamber, an exposure frame, means for winding film to and from the supply chamber and a film passage way through which a film may pass from the supply chamber, across the exposure frame and to the take-up chamber, said take-up chamber comprising an enclosure having a fixed wall and a movable wall spaced to receive a film transversely therebetween and movable to and from the fixed wall, one of said walls including means for contacting with an edge of the film to guide the film propelled by the means for winding film into a coil in the take-up chamber, said wall being solely supported by the edges of the film.

2. The film take-up chamber defined in claim 1 characterized by the means for contacting with an edge of the film comprising a member concave with respect to the opposite wall of the take-up chamber.

3. The film take-up chamber defined in claim 1 characterized by the means for contacting with an edge of the film comprising a member concave with respect to the opposite wall of the take-up chamber and being spaced therefrom a distance such that portions of the concave wall may lie closer to the fixed wall than the width of the film whereby a film coil may lie in the take-up chamber spaced from the walls of the enclosure except for the relatively movable and fixed walls engaging the edges of the film.

4. The film take-up chamber defined in claim 1 characterized by the means for contacting with an edge of the film comprising a member concave with respect to the opposite wall of the take-up chamber, means for guiding the movable wall for movement to and from the fixed wall, and a spring tending to move the movable wall toward the fixed wall.

5. The film take-up chamber defined in claim 1 characterized by the means for contacting with an edge of the film comprising a member concave with respect to the opposite wall of the take-up chamber, means for guiding the movable wall for movement to and from the fixed wall, a spring tending to move the movable wall toward the fixed wall, and means for limiting such movement to retain a space between said walls to receive a film.

6. A film take-up chamber for use in photographic apparatus, the apparatus including a supply chamber, an exposure frame, means for winding film to and from the supply chamber and a film passage way through which a film may pass from the supply chamber, across the exposure frame and to the take-up chamber, said take-up chamber comprising an enclosure having a fixed wall and a movable wall spaced to receive a film transversely therebetween when a film is moved by the means for winding film through the passageway to the take-up chamber the movable wall being mounted for movement to and from the fixed wall, one of said walls including means for contacting with an edge of the film to guide the film into a coil in the take-up chamber, said coil being solely supported by the edges of the film, said take-up chamber including a slot leading from the film passageway to the take-up chamber, said slot also extending through a portion of said movable wall.

7. A film take-up chamber for use in photographic apparatus, the apparatus including a supply chamber, an exposure frame, means for winding film to and from the supply chamber and a film passageway through which a film may pass from the supply chamber, across the exposure frame and to the take-up chamber, said take-up chamber comprising an enclosure having a fixed wall and a movable wall spaced to receive a film transversely therebetween and movable to and from the fixed wall, one of said walls including means for contacting with an edge of the film moved through the passageway by the means for moving film into the take-up chamber to guide the film into a coil in the take-up chamber, said coil being solely supported by the edges of the film, means for limiting the movement of the movable wall relative to the fixed wall and for preventing turning movement thereof, and a film passage slot extending through the enclosure and at least through a part of the movable wall.

8. A film take-up chamber for use in photographic apparatus, the apparatus including a supply chamber, an exposure frame, means for winding film to and from the supply chamber and a film passageway through which a film may pass from the supply chamber, across the exposure frame and to the take-up chamber, said take-up chamber comprising an enclosure having a fixed wall and a movable wall spaced to receive a film transversely therebetween moved by the means for winding film, the movable wall being movable to and from the fixed wall, one of said walls including means for contacting with an edge of the film to guide the film into a coil in the take-up chamber, said coil being solely supported by the edges of the film, means for limiting the movement of the movable wall relative to the fixed wall and for preventing turning movement thereof, said movable wall being concave with respect to the fixed wall and having the outer edges closer to the fixed wall than the central portions between the edges, and a film passageway slot extending through the movable wall from an edge thereof upwardly to provide a passageway of greater height than the width of a film.

9. A film take-up chamber for use in photographic apparatus, the apparatus including a supply chamber, an exposure frame, means for winding film to and from the supply chamber and a film passageway through which a film may pass from the supply chamber, across the exposure frame and to the take-up chamber, said take-up chamber comprising an enclosure having a fixed wall and a movable wall spaced to receive a film transversely therebetween and movable to and from the fixed wall when a film is moved to the take-up chamber by the means for winding film, one of said walls including means for contacting with an edge of the film to guide the film into a coil in the take-up chamber, said coil being solely supported by the edges of the film, means for limiting the movement of the movable wall relative to the fixed wall and for preventing turning movement thereof, said movable wall being concave with respect to the fixed wall and having the outer edges closer to the fixed wall than the central portions between the edges, the outer edges lying closer to the fixed wall than the width of a film, and a film passageway slot extending through the movable wall from an edge thereof upwardly to provide a passageway of greater height than the width of a film whereby film entering the slot may be edge guided into a coil by the concave wall.

10. A film take-up chamber for use in photographic apparatus, the apparatus including a supply chamber, an exposure frame, means for winding film to and from the supply chamber and a film passageway through which a film may pass from the supply chamber, across the exposure frame and to the take-up chamber, said take-up chamber comprising an enclosure having a fixed wall and a movable wall spaced to receive a film transversely therebetween and movable to and from the fixed wall when the film is moved by the means for winding film into the take-up chamber, one of said walls including means for contacting with an edge of the film to guide the film into a coil in the take-up chamber, said coil being solely supported by the edges of the film, means for limiting the movement of the movable wall relative to the fixed wall and for preventing turning movement thereof, said movable wall being concave with respect to the fixed wall and having the outer edges closer to the fixed wall than the central portions between the edges, the outer edges lying closer to the fixed wall than the width of a film, and a film passageway slot extending through the movable wall from an edge thereof upwardly to provide a passageway of greater height than the width of a film whereby film entering the slot may be edge guided into a coil by the concave wall, a spring tending to move the relatively movable wall toward the fixed wall, said spring permitting movement of the movable wall away from the fixed wall when the size of the film coil increases as film is propelled into the take-up chamber.

11. A film take-up chamber for use in photographic apparatus, the apparatus including a supply chamber, an exposure frame, means for winding film to and from the supply chamber and a film passageway through which a film may pass from the supply chamber, across the exposure frame and to the take-up chamber, said take-up chamber comprising a slotted enclosure of variable length to receive film and having walls, one of the walls for varying the length of the enclosure having an inclined film engaging surface to position a film moved into the film take-up chamber by the means for winding film.

12. A film take-up chamber for use in photographic apparatus, the apparatus including a supply chamber, an exposure frame, means for winding film to and from the supply chamber and a film passageway through which a film may pass from the supply chamber, across the exposure frame and to the take-up chamber said take-up chamber comprising a slotted enclosure of variable length to receive film and having walls, one of the walls for varying the length of the enclosure having an inclined film engaging surface to position a film moved into the film take-up chamber by the means for winding film, a spring tending to hold the enclosure at a minimum length, said length being increased as convolutions of film are passed into the enclosure.

PAUL J. ERNISSE.

REFERENCES CITED

The following references are of record in the file of this patent:

UNITED STATES PATENTS

| Number | Name | Date |
| --- | --- | --- |
| 1,128,649 | Adams | Feb. 16, 1915 |
| 1,942,869 | McMaster | Jan. 9, 1934 |
| 1,998,324 | Lloyd | Apr. 16, 1935 |
| 2,336,278 | Mihalyi | Dec. 7, 1943 |

FOREIGN PATENTS

| Number | Country | Date |
| --- | --- | --- |
| 286,981 | Italy | Oct. 3, 1929 |